US009320040B2

(12) United States Patent
Bellot et al.

(10) Patent No.: US 9,320,040 B2
(45) Date of Patent: *Apr. 19, 2016

(54) METHOD AND DEVICE FOR SENDING/RECEIVING ELECTROMAGNETIC SIGNALS RECEIVED/SENT ON ONE OR MORE FIRST FREQUENCY BANDS

(71) Applicant: E-Blink SA, Pleasanton, CA (US)

(72) Inventors: Laurent Bellot, Versailles (FR); Stéphane Blanc, Breuillet (FR); Tariq Boukour, Beuvry la Foret (FR); Jean-Christophe Plumecoq, Palaiseau (FR); Jawad El Sayed, Courbevoie (FR)

(73) Assignee: E-Blink, Pleasanton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/705,964

(22) Filed: May 6, 2015

(65) Prior Publication Data

US 2015/0245354 A1   Aug. 27, 2015

Related U.S. Application Data

(63) Continuation of application No. 13/580,687, filed as application No. PCT/FR2011/050380 on Feb. 24, 2011, now Pat. No. 9,083,440.

(30) Foreign Application Priority Data

Feb. 26, 2010  (FR) .................................... 10 51418

(51) Int. Cl.
*H04B 7/24* (2006.01)
*H04W 72/04* (2009.01)
(Continued)

(52) U.S. Cl.
CPC ............. *H04W 72/0453* (2013.01); *H04B 1/40* (2013.01); *H04L 5/0039* (2013.01)

(58) Field of Classification Search
CPC .... H04B 1/40; H04B 10/2575; H04B 10/516; H04B 10/00; H04B 10/25759; H04B 10/40; H04B 17/0005; H04B 17/0057; H04B 17/11; H04B 1/0053; H04B 1/04; H04B 1/0458; H04B 1/0475; H04B 1/16; H04B 1/1607; H04B 1/405; H04B 2001/0425
USPC .......................................................... 455/39
See application file for complete search history.

(56) References Cited

U.S. PATENT DOCUMENTS

| 4,806,878 A | 2/1989 | Cowley |
| 4,827,395 A | 5/1989 | Anders et al. |

(Continued)

FOREIGN PATENT DOCUMENTS

| AU | 2004311246 | 6/2005 |
| AU | 2007270980 | 1/2008 |

(Continued)

OTHER PUBLICATIONS

International Search Report dated Aug. 9, 2013 6186PCT Application No. PCT/EP2013/059236.

(Continued)

*Primary Examiner* — Ajibola Akinyemi
(74) *Attorney, Agent, or Firm* — Carr & Ferrell LLP

(57) ABSTRACT

In order to send electromagnetic signals received on one or more first frequency bands, the method applies a transformation to the signals, by performing the following actions: selecting first frequency sub-bands, forming a first set of frequency sub-bands of the first frequency band(s); using organization rules to associate one or more second sets of frequency sub-bands, forming one or more second frequency bands, with each first frequency sub-band of the first set; and using optimization rules to determine frequency translations to transpose the signals received in the first frequency sub-bands into signals sent in the second frequency band(s).

11 Claims, 8 Drawing Sheets

(51) Int. Cl.
*H04L 5/00* (2006.01)
*H04B 1/40* (2015.01)

(56) References Cited

U.S. PATENT DOCUMENTS

| | | |
|---|---|---|
| 5,513,176 A | 4/1996 | Dean et al. |
| 5,533,011 A | 7/1996 | Dean et al. |
| 5,602,834 A | 2/1997 | Dean et al. |
| 5,652,765 A | 7/1997 | Adachi et al. |
| 5,768,268 A | 6/1998 | Kline et al. |
| 5,842,002 A | 11/1998 | Schnurer et al. |
| 5,867,763 A | 2/1999 | Dean et al. |
| 5,940,598 A | 8/1999 | Strauss et al. |
| 5,969,678 A | 10/1999 | Stewart |
| 6,049,315 A | 4/2000 | Meyer |
| 6,072,994 A | 6/2000 | Phillips et al. |
| 6,094,677 A | 7/2000 | Capek et al. |
| 6,122,529 A | 9/2000 | Sabat, Jr. et al. |
| 6,223,021 B1* | 4/2001 | Silvia ............. H04W 88/085 455/313 |
| 6,339,611 B1 | 1/2002 | Antonio et al. |
| 6,349,214 B1 | 2/2002 | Braun |
| 6,385,435 B1 | 5/2002 | Lee |
| 6,389,059 B1 | 5/2002 | Smith et al. |
| 6,603,956 B1 | 8/2003 | Shin |
| 6,640,110 B1 | 10/2003 | Shapira et al. |
| 6,904,266 B1 | 6/2005 | Jin et al. |
| 7,010,325 B1 | 3/2006 | Oh |
| 7,068,973 B1 | 6/2006 | Lovinggood et al. |
| 7,123,911 B1 | 10/2006 | Ngan |
| 7,463,673 B2 | 12/2008 | Fujii et al. |
| 7,535,972 B2 | 5/2009 | Hammerschmidt et al. |
| 7,680,203 B2 | 3/2010 | Kuroda |
| 7,738,579 B2 | 6/2010 | Sadowsky et al. |
| 7,801,230 B2 | 9/2010 | Sung et al. |
| 8,064,821 B2 | 11/2011 | Roland et al. |
| 8,275,310 B2 | 9/2012 | Rolland et al. |
| 8,467,488 B2 | 6/2013 | Rolland et al. |
| 8,761,141 B2 | 6/2014 | Leroudier |
| 8,811,558 B2 | 8/2014 | Rolland et al. |
| 9,020,070 B2 | 4/2015 | Bellot et al. |
| 9,083,440 B2 | 7/2015 | Bellot et al. |
| 2001/0011009 A1 | 8/2001 | Harada et al. |
| 2001/0031624 A1 | 10/2001 | Schmutz |
| 2002/0028655 A1 | 3/2002 | Rosener et al. |
| 2002/0072375 A1 | 6/2002 | Huslig |
| 2002/0140654 A1 | 10/2002 | Kim et al. |
| 2002/0147978 A1 | 10/2002 | Dolgonos et al. |
| 2003/0016701 A1 | 1/2003 | Hinson |
| 2003/0022650 A1 | 1/2003 | Tsuji et al. |
| 2003/0027597 A1 | 2/2003 | LaGrotta et al. |
| 2003/0140256 A1 | 7/2003 | Hauenstein et al. |
| 2003/0232595 A1 | 12/2003 | Baker et al. |
| 2004/0015712 A1 | 1/2004 | Szor |
| 2004/0048596 A1 | 3/2004 | Wyrzykowska et al. |
| 2004/0052226 A1 | 3/2004 | Frank et al. |
| 2004/0077345 A1 | 4/2004 | Turner et al. |
| 2004/0145849 A1 | 7/2004 | Chang et al. |
| 2004/0150569 A1 | 8/2004 | Proctor, Jr. et al. |
| 2004/0157551 A1 | 8/2004 | Gainey et al. |
| 2004/0166802 A1 | 8/2004 | McKay, Sr. et al. |
| 2005/0085267 A1 | 4/2005 | Lemson et al. |
| 2005/0101349 A1 | 5/2005 | Pihlajamaa et al. |
| 2005/0130587 A1 | 6/2005 | Suda et al. |
| 2005/0176368 A1 | 8/2005 | Young et al. |
| 2005/0256963 A1 | 11/2005 | Proctor, Jr. et al. |
| 2006/0068848 A1 | 3/2006 | Shapira et al. |
| 2006/0105705 A1 | 5/2006 | Maca et al. |
| 2006/0140161 A1 | 6/2006 | Stephens et al. |
| 2006/0205343 A1 | 9/2006 | Runyon et al. |
| 2007/0053409 A1* | 3/2007 | Reunamaki ............. H04L 5/14 375/130 |
| 2007/0091896 A1 | 4/2007 | Liu |
| 2007/0147278 A1 | 6/2007 | Millar |
| 2007/0243824 A1 | 10/2007 | Roland et al. |
| 2008/0181171 A1 | 7/2008 | Koziy et al. |
| 2009/0003831 A1 | 1/2009 | Zheng |
| 2009/0252267 A1 | 10/2009 | Rolland et al. |
| 2009/0325479 A1 | 12/2009 | Chakrabarti et al. |
| 2010/0056162 A1 | 3/2010 | Rolland et al. |
| 2010/0142598 A1 | 6/2010 | Murray et al. |
| 2012/0100847 A1 | 4/2012 | Rahman |
| 2012/0140654 A1 | 6/2012 | Pak et al. |
| 2013/0101299 A1 | 4/2013 | Bellot et al. |
| 2013/0243142 A1 | 9/2013 | Rolland et al. |
| 2013/0294253 A1 | 11/2013 | Leroudier |
| 2013/0294541 A1 | 11/2013 | Blanc et al. |
| 2014/0328274 A1 | 11/2014 | Blanc et al. |
| 2014/0334305 A1 | 11/2014 | Leroudier |

FOREIGN PATENT DOCUMENTS

| | | |
|---|---|---|
| BR | PI0416338 | 2/2007 |
| BR | PI0713863 | 11/2012 |
| CA | 2546179 | 6/2005 |
| CA | 2655719 | 1/2008 |
| CA | 2790815 | 9/2011 |
| CN | 1256034 | 6/2000 |
| CN | 1325227 | 12/2001 |
| CN | 1792045 | 6/2006 |
| CN | 1883216 | 12/2006 |
| CN | 101647211 | 2/2010 |
| CN | 102918923 | 2/2013 |
| CN | 101485110 | 11/2013 |
| CN | 104272138 | 1/2015 |
| CN | 104272858 | 1/2015 |
| DE | 3108901 | 9/1982 |
| DK | 160429 | 12/2009 |
| EA | 010460 | 8/2008 |
| EA | 201201190 | 4/2013 |
| EP | 1501215 | 1/2005 |
| EP | 1534027 | 5/2005 |
| EP | 1564911 | 8/2005 |
| EP | 1648099 | 4/2006 |
| EP | 1876728 | 1/2008 |
| EP | 1895681 | 3/2008 |
| EP | 160429 | 8/2009 |
| EP | 2099183 | 9/2009 |
| EP | 2540136 | 1/2013 |
| EP | 2859377 | 4/2015 |
| ES | 2332368 | 2/2010 |
| FR | 2747867 | 10/1997 |
| FR | 2862451 | 5/2005 |
| FR | 2956934 | 9/2011 |
| FR | 2990315 | 11/2013 |
| IL | 175549 | 12/2010 |
| JP | S59-154827 | 9/1984 |
| JP | H06-165240 | 6/1994 |
| JP | H06-35520 | 12/1994 |
| JP | H09-288676 | 11/1997 |
| JP | 10200473 | 7/1998 |
| JP | H11-41158 | 2/1999 |
| JP | 2000504898 | 4/2000 |
| JP | 200116153 | 1/2001 |
| JP | 2003521142 | 7/2003 |
| JP | 2004527926 | 9/2004 |
| JP | 2007295569 A | 11/2007 |
| JP | 2010200241 A | 9/2010 |
| JP | KR10/2013/0049175 | 5/2013 |
| JP | 2013-520902 | 6/2013 |
| JP | 5335193 | 8/2013 |
| JP | 5439648 | 12/2013 |
| KR | 101119574 | 2/2012 |
| KR | 101391286 | 5/2014 |
| KR | 20150007336 | 1/2015 |
| KR | 10/215/0023349 | 3/2015 |
| OA | 13286 | 1/2007 |
| PT | 1690429 | 11/2009 |
| RS | 51094 | 10/2010 |
| UA | 92456 | 11/2010 |
| WO | WO9210890 | 6/1992 |
| WO | WO9729608 | 8/1997 |
| WO | WO9948309 | 9/1999 |
| WO | WO0072471 | 11/2000 |

(56) References Cited

FOREIGN PATENT DOCUMENTS

| WO | WO03055246 | 7/2003 |
|---|---|---|
| WO | WO2004027635 | 4/2004 |
| WO | WO2004045125 | 5/2004 |
| WO | WO2004079946 | 9/2004 |
| WO | WO2005/05107 | 1/2005 |
| WO | WO2005051017 | 6/2005 |
| WO | WO2008003911 | 1/2008 |
| WO | WO2008029055 | 3/2008 |
| WO | WO2008067584 | 6/2008 |
| WO | WO2011104481 | 9/2011 |
| WO | WO2013164445 | 11/2013 |
| WO | WO2013166331 | 11/2013 |

OTHER PUBLICATIONS

International Search Report dated Jul. 12, 2013 6185PCT Application No. PCT/US2013/039338.
International Search Report dated Jan. 15, 2008 Application No. PCT/FR2007/051602.
European Search Opinion dated Nov. 13, 2006 in European Application No. 06291127.6.
Objection dated Apr. 2, 2012 in Israeli Application No. 196138.
Notice before Acceptance of Patent Application dated Oct. 22, 2014 in Israeli Application No. 196138.
Search Report dated May 20, 2005 from Fr Application No. 0313391.
International Search Report dated Jan. 15, 2008 Application No. PCT/FR2004/002932.
Communication dated Oct. 13, 2006 in European Application No. 04805469.6.
Communication dated Aug. 21, 2007 in European Application No. 04805469.6.
Intention to grant dated Feb. 13, 2009 in European Application No. 04805469.6.
European Search Opinion dated Apr. 13, 2007 in European Application No. 06291394.2.
Communication dated Jun. 10, 2013 in European Application No. 06291394.2.
International Search Report dated Jun. 20, 2008 Application No. PCT/FR2007/051867.
Preliminary Search Report dated Nov. 2, 2010 in French Application No. 1051418.
International Search Report dated Jun. 10, 2011 in Application No. PCT/FR2011/050380.
Non Final Office Action, Jun. 3, 2013, U.S. Appl. No. 13/732,273, filed Dec. 31, 2012.
Notice of Allowance, Jan. 17, 2014, U.S. Appl. No. 13/732,273, filed Dec. 31, 2012.
Non Final Office Action, May 3, 2013, U.S. Appl. No. 13/735,903, filed Jan. 7, 2013.
Final Office Action, Aug. 20, 2013, U.S. Appl. No. 13/735,903, filed Jan. 7, 2013.
Non Final Office Action, Feb. 20, 2014, U.S. Appl. No. 13/735,903, filed Jan. 7, 2013.
Non Final Office Action, Aug. 18, 2014, U.S. Appl. No. 13/735,903, filed Jan. 7, 2013.
Notice of Allowance, Dec. 2, 2014, U.S. Appl. No. 13/735,903, filed Jan. 7, 2013.
Non Final Office Action, Feb. 16, 2011, U.S. Appl. No. 12/306,306, filed Jul. 5, 2007.
Final Office Action, Nov. 2, 2011, U.S. Appl. No. 12/306,306, filed Jul. 5, 2007.
Non Final Office Action, Jun. 29, 2012, U.S. Appl. No. 12/306,306, filed Jul. 5, 2007.
Notice of Allowance, Jan. 30, 2013, U.S. Appl. No. 12/306,306, filed Jul. 5, 2007.
Non Final Office Action, Nov. 6, 2009, U.S. Appl. No. 10/579,474, filed Mar. 7, 2007.
Final Office Action, May 17, 2010, U.S. Appl. No. 10/579,474, filed Mar. 7, 2007.
Non Final Office Action, Oct. 27, 2010, U.S. Appl. No. 10/579,474, filed Mar. 7, 2007.
Notice of Allowance, Jul. 20, 2011, U.S. Appl. No. 10/579,474, filed Mar. 7, 2007.
Non Final Office Action, Aug. 4, 2011, U.S. Appl. No. 12/439,837, filed Oct. 6, 2009.
Notice of Allowance, Jun. 5, 2012, U.S. Appl. No. 12/439,837, filed Oct. 6, 2009.
Non Final Office Action, Sep. 17, 2013, U.S. Appl. No. 13/874,296, filed Apr. 30, 2013.
Notice of Allowance, Apr. 10, 2014, U.S. Appl. No. 13/874,296, filed Apr. 30, 2013.
Non Final Office Action, Nov. 7, 2014, U.S. Appl. No. 13/580,687, filed Jan. 15, 2013.
Notice of Allowance, Mar. 2, 2015, U.S. Appl. No. 13/580,687, filed Jan. 15, 2013.
Office Action dated Nov. 2, 2015 in China Application No. 201380023590.3.

* cited by examiner

Fig. 8

| 60 | $F_{2,1,1}$ | $F_{2,1,2}$ | $F_{2,1,4}$ | $F_{2,j,k}$ | ... | ... | $F_{2,N,1}$ | $F_{2,1,3}$ | $F_{2,N,k}$ | $F_{2,N,Ns}$ |
|---|---|---|---|---|---|---|---|---|---|---|
| $F_{1,1,1}$ | 1 | | | | | | | | | |
| $F_{1,1,2}$ | | 1 | | | | | | | | |
| $F_{1,1,3}$ | | | | | | | | 1 | | |
| $F_{1,1,4}$ | | | 1 | | | | | | | |
| ... | | | | | | | | | | |
| $F_{1,j,k}$ | | | | 1 | | | | | | |
| ... | | | | | | | | | | |
| $F_{1,N,1}$ | | | | | 0,1 | | 0,2 | | | |
| $F_{1,N,k}$ | | | | | | | | | 1 | |
| $F_{1,N,Ns}$ | | | | | | | | | | 1 |

METHOD AND DEVICE FOR SENDING/RECEIVING ELECTROMAGNETIC SIGNALS RECEIVED/SENT ON ONE OR MORE FIRST FREQUENCY BANDS

CROSS REFERENCE TO RELATED APPLICATIONS

The present patent application is a continuation of U.S. patent application Ser. No. 13/580,687 (now U.S. Pat. No. 9,083,440, issued Jul. 14, 2015), which entered the U.S. national stage under 35 U.S.C. §371 of the Patent Cooperation Treaty (PCT) on Jan. 15, 2013 from international patent application number PCT/FR2011/050380 filed on Feb. 24, 2011, which is related to and claims priority benefit of French Application Number 1051418 filed on Feb. 26, 2010, now French Patent Serial Number 2956934. The disclosures of each of the above referenced applications are incorporated herein by reference in their entirety.

FIELD OF THE INVENTION

The field of the invention is that of electromagnetic signal transmission.

More particularly, the invention relates to a method and device for transmitting/receiving electromagnetic signals received/transmitted in one or more first frequency bands.

BACKGROUND

Electromagnetic signals are used in many areas for communicating many types of information. In the light spectrum, electromagnetic signals are generally conveyed over optical fibers. In the radio wave spectrum, electromagnetic signals are conveyed via coaxial cables or radiated and picked up by antennas. When the signals are transmitted via a hardware medium, such as a cable or optical fiber, multiple media can be used to increase the volume of transmissible signals. In a single medium, space or even an optical fiber, many issues arise, interference problems, problems with available frequency bands, or with operating the spectrum.

Whenever a frequency band is available, it must not be wasted. Fragmentation of frequency sub-bands within an available frequency band requires greater bandwidth for the same amount of signals to be transmitted.

Seeking optimal frequency band operation while avoiding fragmentation is a constant concern.

The international patent application WO2008/067584 discloses a method wherein baseband digital signals are modulated in adjoining frequency sub-bands. However, this document is limited to teaching how to produce non-fragmented frequency bands when controlling the original, e.g. baseband, signal modulation method.

A problem arises when the signals to be transmitted are not received in baseband, but already modulated in frequency sub-bands using complex coding and protocols.

A recurrent problem then arises when the frequency sub-bands in which the signals are located are distributed in a fragmented manner over one or even several frequency bands. This is the case namely in mobile or cellular telecommunications for which different often separate frequency bands are assigned to each constantly evolving standard, 2G, 3G, 4G.

Then again, the same frequency band can be split among several operators. For the same operator, frequency sub-bands can be distributed in a different way, with intentional or unintentional gaps between uplinks and downlinks or from cell to cell.

SUMMARY OF THE INVENTION

In order to overcome the problems of the state of the art, an object of the invention is a method for transmitting/receiving electromagnetic signals received/transmitted in one or more first frequency bands. Remarkably, the method comprises the steps of: selecting first frequency sub-bands forming a first set of frequency sub-bands of said first frequency band(s); in accordance with organizational rules, associating with each first frequency sub-band forming said first set one or more second sets of frequency sub-bands forming one or more second frequency bands; and in accordance with optimization rules, determining frequency translations for transposing signals received in the first frequency sub-bands to signals transmitted in the second frequency band(s).

In particular, the selection is applied only to the frequency sub-bands in which wanted electromagnetic signals are received.

Also in particular, the organizational rules include rules of associating a second frequency sub-band with a segment covering all or part of a first frequency sub-band.

Advantageously, the optimization rules include rules for establishing a second set of frequency sub-bands each related to at least one other frequency sub-band of said set.

More particularly, the method is used in a cellular communication network.

Even more particularly, signals are transmitted over a wireless connection.

Another implementation of interest is where signals are transmitted via an optical fiber.

Also an object of the invention is a device for implementing the above-mentioned method.

Namely, the device for transmitting electromagnetic signals received in one or more first frequency bands, comprises: a bank of filters each having a pass band; at the input of each filter, a first frequency converter intersecting a first sub-band of a first frequency band with the pass band of the filter associated therewith; and at the output of each filter, a second frequency converter bringing the pass band of the filter associated therewith to a second sub-band of a second frequency band.

In particular, each first frequency converter is controlled by an input setpoint generator in order to intersect with the pass band of the filter associated therewith a first frequency sub-band in which wanted signals are received.

Also in particular, each filter is controlled by a pass band adapter so as to superimpose the pass band of the filter on a first frequency sub-band segment.

Advantageously, each second frequency converter is controlled by an output setpoint generator so as to release the second frequency sub-band obtained at the filter output, next to at least one other frequency sub-band of the second frequency set.

BRIEF DESCRIPTION OF DRAWING FIGURES

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclo- FIG. 1 is a schematic representation of a cellular telecommunications network;

FIG. 8 is a matrix for implementing the method according to the invention; and

DETAILED DESCRIPTION

Figure 1:
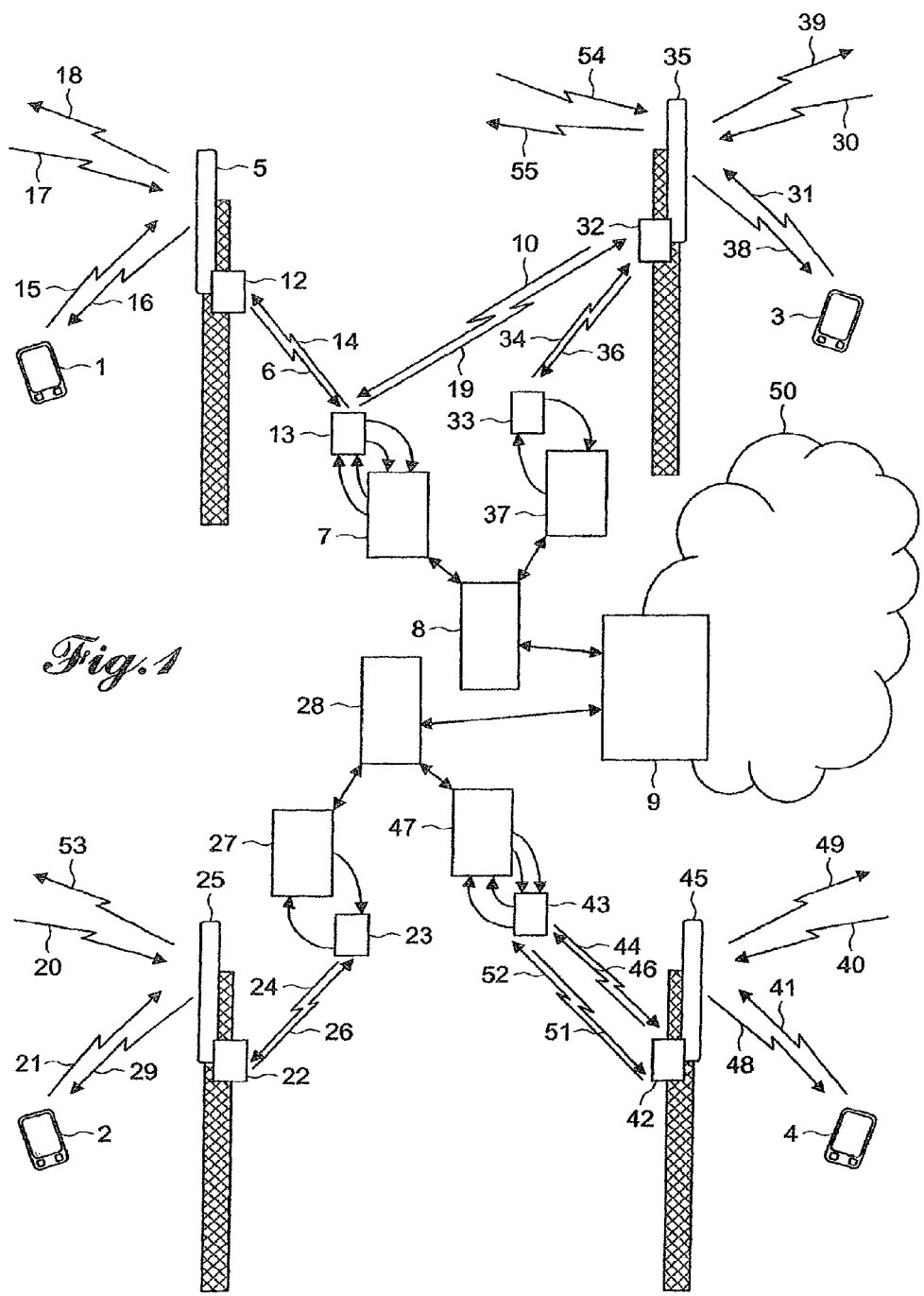

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 shows a mobile telephone access network comprising several relay antennas 5, 25, 35, 45, and a mobile telephone core network 50.

Antenna 5 picks up electromagnetic signals on uplinks 15, 17. E.g., uplink 15 comes from a mobile terminal 1. Antenna 5 dually radiates electromagnetic signals on downlinks 16, 13. E.g., downlink 16 is for mobile terminal 1. Similarly, antennas 25, 35, 45 pick up electromagnetic signals on uplinks 20, 21, 30, 31, 54, 40, 41. E.g., uplinks 21, 31, 41 come from mobile terminals 2, 3, 4. Also, antennas 25, 35, 45 radiate electromagnetic signals on downlinks 29, 38, 39, 48, 49, 53, 55. E.g., downlinks 29, 38, 48, are for mobile terminals 2, 3, 4.

In the access network, radio transmission stations 7, 27, 37, 47, for instance like a Base Station/BTS (Base Transceiver Station) or Node B, are linked to antennas 5, 25, 35, 45 for transmitting and receiving the electromagnetic signals respectively radiated and picked up by the antennas. In a known manner, control stations 8, 28, for instance like a BSC (Base Station Controller) or RAN (Radio Access Network), each manage a group of transmission stations. In the core network 50, switching centers 9, for instance like an MSC (Mobile Switching Center), supervise groups of control stations.

A so-called WRRH (Wireless Remote Radio Head) system comprises a unit 12 in close proximity to antenna 5 and a unit 13 in close proximity to radio transmission station 7 for setting up one or more wireless uplinks 6 from the antenna to the radio transmission station and one or more wireless downlinks 14 from the radio transmission station to the antenna, a unit 22 in close proximity to antenna 25, and a unit 23 in close proximity to radio transmission station 27 for setting up one or more wireless uplinks 26 from the antenna to the radio transmission station and one or more wireless downlinks 24 from the radio transmission station to the antenna, a unit 32 in close proximity to the antenna 35, and a unit 33 in close proximity to radio transmission station 37 for setting up one or more wireless uplinks 36 from the antenna to the radio transmission station and one or more wireless downlinks 34 from the radio transmission station to the antenna, a unit 42 in close proximity to the antenna 45, and a unit 43 in close proximity to the radio transmission station 47 for setting up one or more wireless uplinks 46 from the antenna to the radio transmission station, and one or more wireless downlinks 44 from the radio transmission station to the antenna. As will be apparent throughout the description, the method and device of the invention are particularly advantageous for enabling the WRRH system to set up links between a base station (or part thereof) and the associated operator antennas, by means of wireless connections the operating frequency or frequencies of which are different from those commonly used by the operator. An independently managed sub-system of the WRRH system can be assigned to each radio transmission station 27, 47 or a group of several radio transmission stations 7, 37, for instance in order to enable the radio transmission station to transmit electromagnetic signals to antenna 35 via a link 19 and receive electromagnetic signals from antenna 35 via a link 10. The sub-system covering radio transmission stations 7 and 37 can also cover all or part of radio transmission stations 27, 47, or even other radio transmission stations not represented, and even cover all of the radio transmission stations of the access network.

In the WRRH system, the signals picked up by the antenna in the frequency band(s) of the operator, are filtered, frequency translated to other frequency bands and vice versa for signals radiated by the antenna. Such other frequency bands are bands allowing for a link to be created between the base station and the associated antenna.

Among the services/applications provided by the operator, each operator is assigned the right to use several frequency bands, for instance among those of GSM, UMTS, or others mobile communication standards. This set of frequency bands is designated as $\{F_1\}$ throughout the description.

Figure 2:
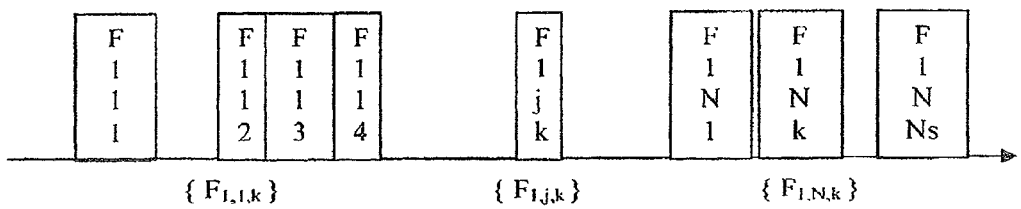
FIG. 2 is a representation of the conversion performed by a method according to the invention.
Figure 2:
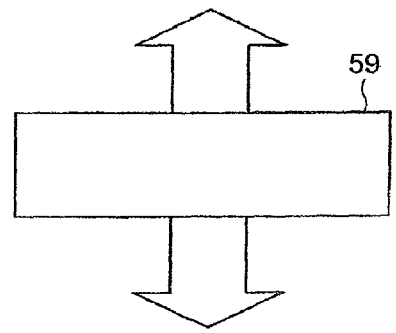
Figure 2:

With reference to FIG. 2, the set $\{F_1\}$ comprises a number N of frequency bands assigned by way of example, but not to be restrictive, to an operator A. Each frequency band is frequency sub-band shared, from which only some form a set $\{F_{1,j,k}\}$ comprising a number Ns of frequency sub-bands $F_{1,j,k}$ allocated to operator A. Each frequency sub-band is called $F_{1,j,k}$, with the first index having the value 1 indicating that the sub-band belongs to a frequency band of the set of frequency bands $\{F_1\}$, the second index j varying from 1 to N indicating the frequency band, i.e. the set $\{F_{1,j,k}\}$ to which the frequency sub-band $F_{1,j,k}$, and index k varying from 1 to Ns, enumerating the frequency sub-bands of the frequency band having the index j.

The space between sub-bands can be occupied either by another operator B, C, . . . , or by applications not related to operator A.

Fundamental frequency sub-bands allocated to or used by the operator A in the same frequency band can form a continuous spectrum collecting fundamental sub-bands in a single sub-band or a fragmented spectrum dispersing fundamental sub-bands into several separate sub-bands.

The MUM system uses a frequency set designated by $\{F_2\}$ throughout the description, for carrying signals belonging to set $\{F_1\}$ between the radio transmission station (like a BTS, node B, or the like) and the antenna of the operator and vice versa. The frequency set $\{F_2\}$ is limited in terms of bandwidth and can be shared with other applications not related to the applications of operator A.

One solution of directly translating all of the frequencies or frequency bands of set $\{F_1\}$ to frequency set $\{F_2\}$ is easy to implement, but does not offer good performance in terms of spectral occupation.

The method of the invention applies a conversion 59 to the signals at frequencies in the frequency bands of set $\{F_1\}$ in order to obtain signals at frequencies in frequency set $\{F_2\}$ so as to compress spectral occupation in the frequency set $\{F_2\}$. Conversion 59 is governed by rules for organizing, selecting, and optimizing the signals from band $\{F_1\}$ in order to efficiently fill the spectrum of frequency set $\{F_2\}$.

Frequencies are translated by sub-band, directly from set $\{F_1\}$ to frequency set $\{F_2\}$, without any demodulation of the signal, in other words without having to know whether the modulation of the signal is a frequency, amplitude, or phase modulation, and without having to know the coding of the signal on the carrier(s), for instance frequency hopping in CDMA (Code Division Multiple Access) or TD-CDMA (Time-Division-Code Division Multiple Access). Signals are frequency translated without having to know the content thereof. In other words, frequency translation of each sub-band is independent from the signal as such. Frequency sub-bands of various operators can be translated independently from each other.

In the example illustrated in FIG. 2, sub-bands $F_{1,1,1}$, $F_{1,1,2}$, $F_{1,1,4}$, are all extracted from set and are respectively translated to sub-bands $F_{2,1,1}$, $F_{2,1,2}$, $F_{2,1,4}$, adjacent to each other in set $\{F_{2,p,q}\}$ within frequency set $(F_2)$. Sub-band $F_{1,j,k}$, $j\ne 1 j\ne N)$ is entirely extracted from set $\{F_{1,j,k}\}$ and is translated to sub-band $F_{2,j,k}$, adjacent to sub-band $F_{2,1,4}$, in set $\{F_{2,p,q}\}$ within frequency set $(F_2)$. Sub-band is only partially extracted from set $\{F_{1,N,k}\}$ and extracted portion or segment is translated to sub-band $F_{2,N,1}$ in set $\{F_{2,m,n}\}$ within frequency set $\{F_2\}$. Sub-band $F_{1,13}$, is entirely extracted from set $\{F_{1,1,k}\}$ and is translated to sub-band $F_{2,1,3}$, related to sub-band $F_{2,N,1}$ in set within frequency set $\{F_{2,m,n}\}$. Sub-bands $F_{1,N,k}$, $F_{1,N,Ns}$ are all extracted from set $\{F_{1,N,k}\}$ and are respectively translated to sub-bands $F_{2,N,k}$, $F_{2,N,Ns}$, related to each other in set $\{F_{2,m,n}\}$ within frequency set $\{F_2\}$.

Thus, conversion 59 performs defragmentation from set $\{F_1\}$ into set $\{F_2\}$.

The conversion 59 is also applicable in reverse to signals at frequencies in the frequency bands of set $\{F_2\}$ in order to obtain signals at frequencies in frequency set $\{F_1\}$ so as to expand spectral occupation in frequency set $(F_1)$. Conversion 59 will then alternately perform fragmentation from set $\{F_2\}$ into set $\{F_1\}$.

The above explanations are based on a rearrangement of the signals in other frequency bands depending on frequency criteria, namely depending on the original frequency sub-band of the signal. Other criteria can be applied, for instance depending on polarization of the signal, logical or spatial criteria. In a satellite, a spatial criterion would be used for returning certain frequencies to a first spot and other frequencies to a second spot.

Figure 3:
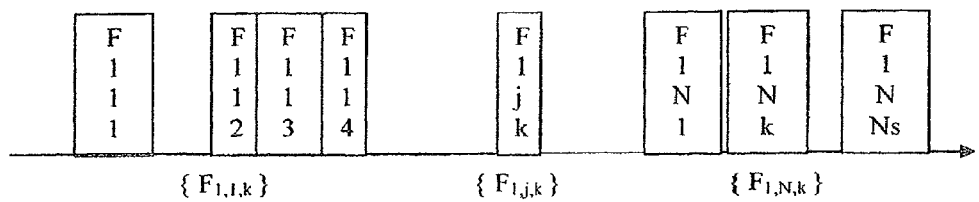
FIG. 3 is another representation of the conversion performed by a method according to the invention.
Figure 3:
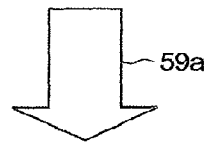
Figure 3:
Figure 3:
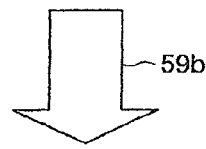
Figure 3:
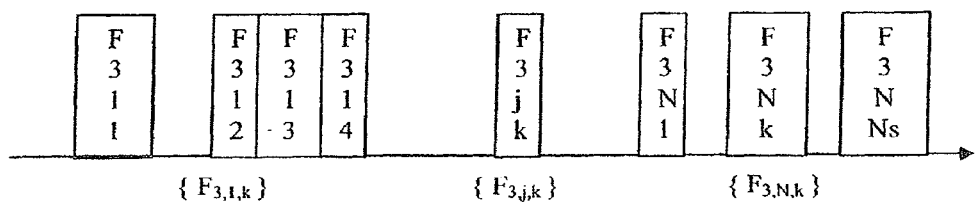

In the WRRH system illustrated by FIG. 1, where frequencies belonging to operator A are to be carried from the antenna to the base station and vice versa, the method of the invention is used twice as will be explained now with reference to FIG. 3.

On uplinks 15, 21, 31, the signals of the operator picked up by antennas 5, 25, 35, for instance respectively in the frequency sub-bands $F_{1,N,1}$, $F_{1,1,3}$, $F_{1,1,1}$, are organized, filtered, and spectrally optimized by a first conversion 59 *a* in order to be carried in links 6, 10, 36 of the wireless connection respectively in frequency sub-bands $F_{2,N,1}$, $F_{2,1,3}$, $F_{2,1,1}$. A second conversion 59 *b* is then applied to the signals carried in links 6, 10, 36 of the wireless connection respectively in frequency sub-bands $F_{2,N,1}$, $F_{2,1,3}$, $F_{2,1,1}$, in order to restore in radio transmission station 7 the signals in the frequency sub-bands $F_{3,N,1}$, $F_{3,1,3}$, and restore in the radio transmission station 37 the signals in the frequency sub-band $F_{3,1,1}$ into a frequency set $\{F_3\}$. Frequency set $\{F_3\}$ can also be the same set as the original one, thereby allowing one frequency set to be carried within another smaller one.

In downlinks 16, 38, 39, the signals of the operator to be radiated by antennas 5, 35, are transmitted by radio transmission stations 7, 37 for instance respectively in frequency sub-bands $F_{1,N,k}$, $F_{1,N,Ns}$, $F_{1,1,2}$. The signals transmitted are organized, filtered, and spectrally optimized by the first conversion 59 *a* in order to be carried on links 14, 19, 34 of the wireless connection respectively in frequency sub-bands $F_{2,N,k}$, $F_{2,N,Ns}$, $F_{2,1,2}$. The second conversion 59*b* is then applied to the signals carried on links 14, 19, 34 of the wireless connection respectively in frequency sub-bands $F_{2,N,k}$, $F_{2,N,Ns}$, $F_{2,1,2}$, so as to restore at antenna 5, the signals in the frequency sub-bands $F_{3,N,k}$, and at antenna 35, the signals in frequency sub-bands $F_{3,N,Ns}$, $F_{3,1,2}$, in frequency set $\{F_3\}$. Here again, frequency set $\{F_3\}$ can be the same set $\{F_1\}$ as the original one, thereby allowing one frequency set to be carried within another smaller one.

Figure 4:
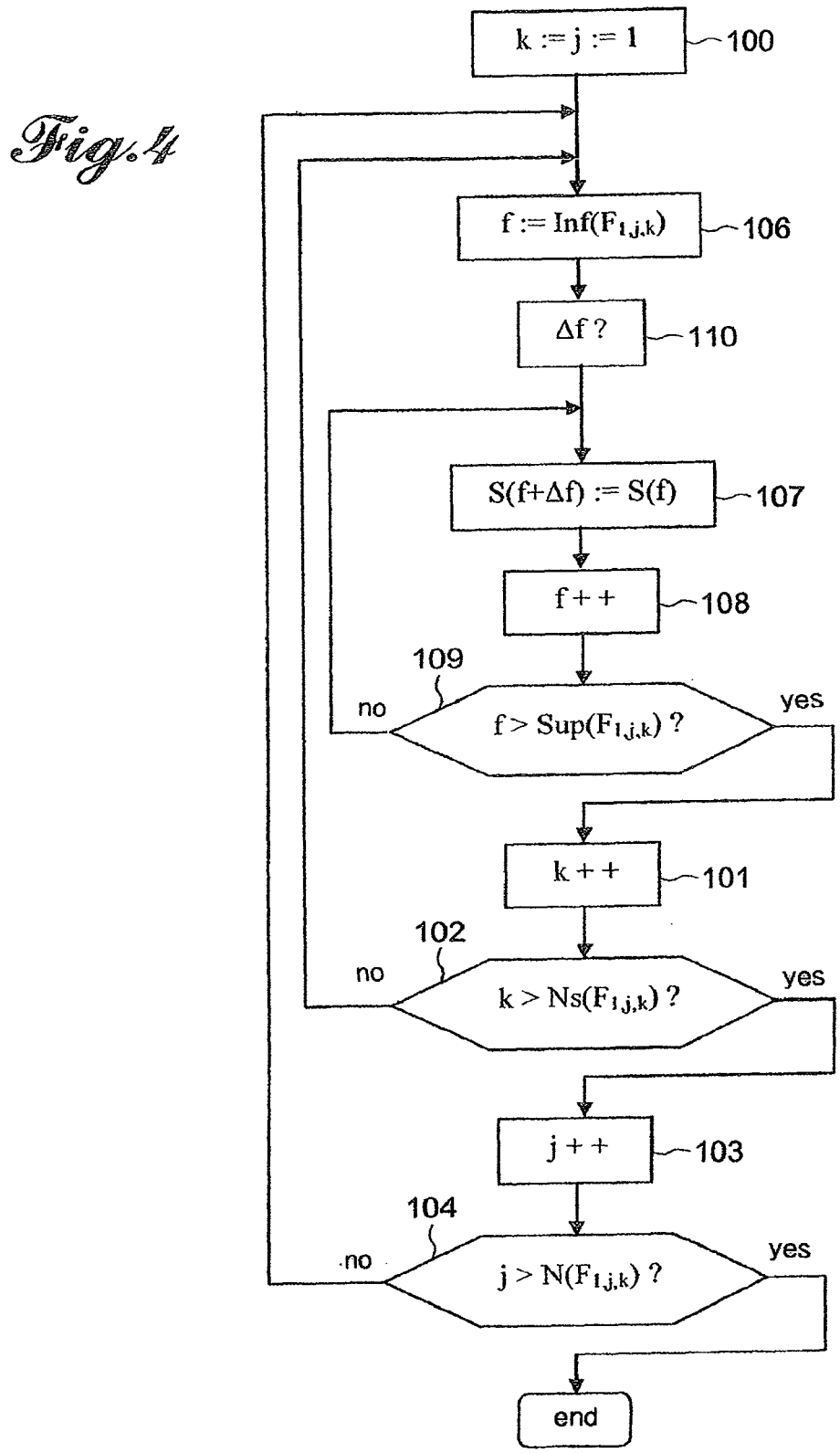
FIGS. 4 to 7 show steps of the method according to the invention.

FIG. 4 shows method steps according to the invention. The frequency bands assigned to operator A are taken into consideration by one execution of an initial step 100 pointing to a first frequency band having an index j set to 1 and by several preferably parallel executions of a step 103 each pointing to a value different from j comprised between 1 and N under the control of step 104. In each frequency band considered, the frequency sub-bands $F_{1,j,k}$, allocated to and/or used by the operator are selected by the execution of the initial step 100 for the first frequency band and by several preferably parallel executions of a step 101 each pointing to a value different from k comprised between 1 and Ns, specific to each frequency band under the control of a step 102 adapting the value of the number Ns to the frequency band where the selection is performed.

Frequencies f comprised between a lower limit $\text{Inf}(F_{1,j,k})$ observed in a step 106 and an upper limit $\text{Sup}(F_{1,j,k})$ of each selected frequency sub-band $F_{1,j,k}$, observed in a step 109, are passed by a step 108 so as to take a signal S(f) at the frequency f and translate it to a frequency f+$\Delta$f in a step 107.

In the implementation presented in FIG. 4, the frequency translation value $\Delta f$ is determined in a step 110 for all of the frequencies of the selected frequency band.

Figure 5:
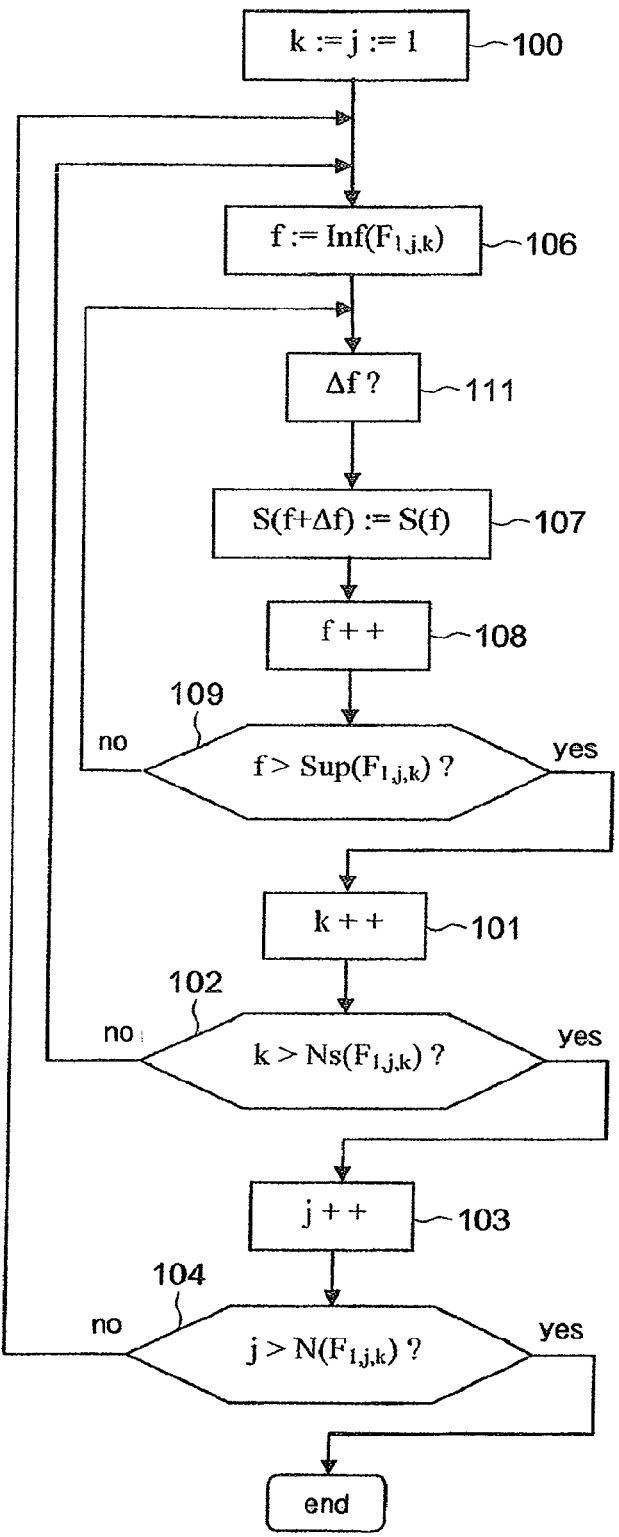

In the implementation presented in the FIG. 5, the frequency translation value $\Delta f$ is determined in a step 111 differently for different frequencies of the frequency set of the selected frequency band.

Figure 6:
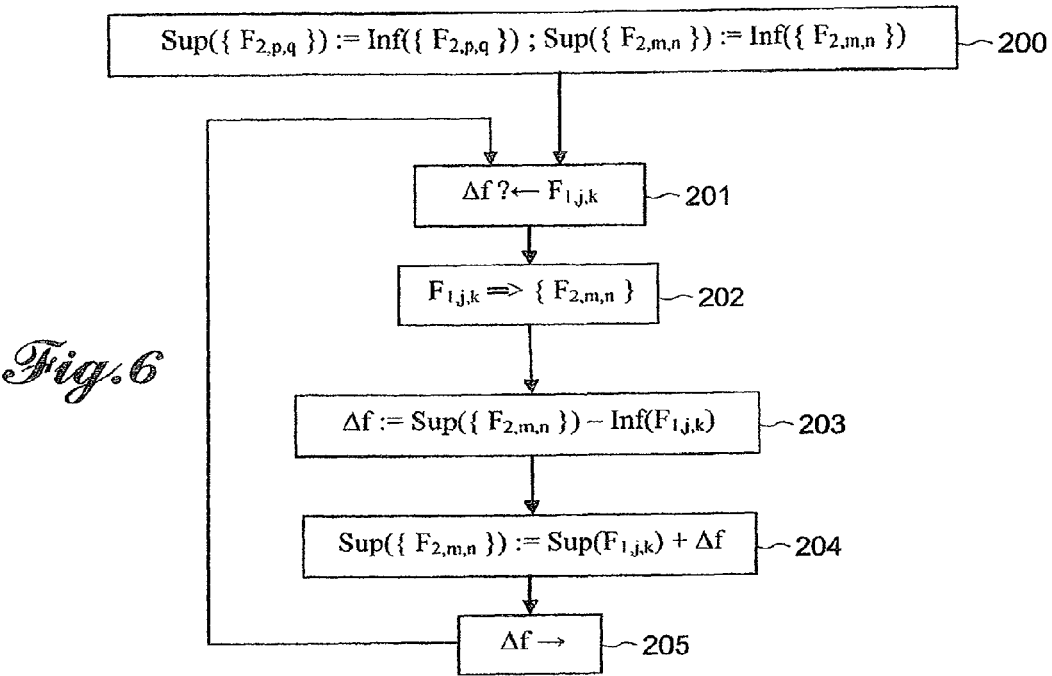

The determination of the frequency translation $\Delta f$ in step 110, is illustrated by steps 200 to 205 represented in FIG. 6.

One or several sets of incoming frequency sub-bands $\{F_{2,p,q}\}$, $\{F_{2,m,n}\}$ are previously defined for instance by the lower frequency limit $\text{Inf}(\{F_{2,p,q}\})$, $\text{Inf}(\{F_{2,m,n}\})$ thereof. In a step 200, the sets of frequency sub-bands are initialized to empty sets by positioning upper limit values $\text{Sup}(\{F_{2,p,q}\})$, $\text{Sup}(\{F_{2,m,n}\})$ equal to the lower limit values $\text{Inf}(\{F_{2,p,q}\})$ $\text{Inf}(\{F_{2,m,n}\})$ of the sets.

For each required frequency translation value $\Delta f$ from one frequency sub-band $F_{1,j,k}$ in an execution of step 201 triggered by step 110, a step 205 generates a frequency translation value $\Delta f$. Between steps 201 and 205, one or more steps each executes a rule relating the frequency translation value f to the frequency sub-band $F_{1,j,k}$ to which it is applicable.

For instance, a step 202 executes an organizational rule which consists in assigning an incoming set $\{F_{2,m,n}\}$ to the frequency sub-band $F_{1,j,k}$ unique for the set of selected sub-bands, or different, for instance depending on logical criteria pre-established at the transmitters or receivers of the signals, on the granted data rates, communication protocols, semantics of content, or the like.

E.g., a step 203 executes an optimization rule which consists in translating the lower limit $\text{Inf}(F_{1,j,k})$ of the frequency sub-band so as to map it to the upper limit $\text{Sup}(\{F_{2,m,n}\})$, apart from a safety margin.

A step 204 associated with step 203 then updates the upper limit $\text{Sup}(\{F_{2,m,n}\})$ so as to take into account the addition of sub-band $F_{1,j,k}$ translated into set $\{F_{2,m,n}\}$.

Figure 7:
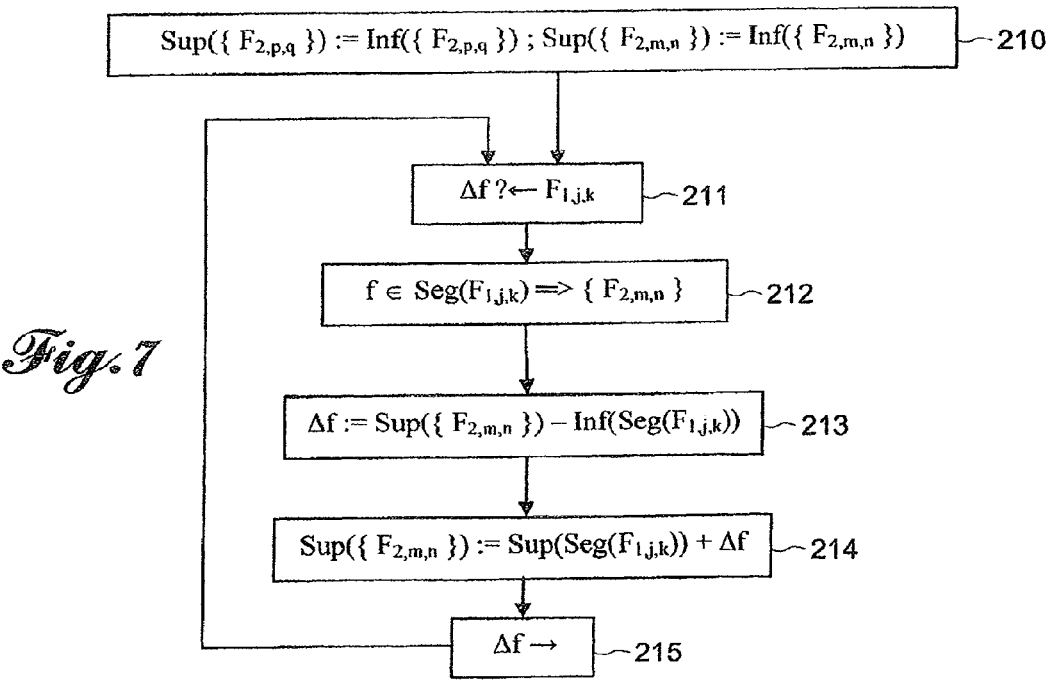

The determination of the frequency translation $\Delta f$ in step 111 is illustrated by steps 210 to 215 represented in FIG. 7.

One or more sets of incoming frequency sub-bands $\{F_{2,p,q}\}$, $\{F_{2,m,n}\}$ are here previously defined for instance by the lower frequency limit $\text{Inf}(\{F_{2,p,q}\})$, $\text{Inf}(\{F_{2,m,n}\})$ thereof. In a step 210, the sets of frequency sub-bands are initialized to empty sets by positioning upper limit values $\text{Sup}(\{F_{2,p,q}\})$, $\text{Sup}(\{F_{2,m,n}\})$ equal to the lower limit values $\text{Inf}(\{F_{2,p,q}\})$ $\text{Inf}(\{F_{2,m,n}\})$ of the sets.

For each required frequency translation value $\Delta f$ from one frequency sub-band $F_{1,j,k}$ in an execution of step 211 triggered by step 111, a step 215 generates a frequency translation value $\Delta f$. Between steps 211 and 215, one or more steps each executes a rule relating the frequency translation value $\Delta f$ to a segment $\text{Seg}(F_{1,j,k})$ of the frequency sub-band $F_{1,j,k}$ to which it is applicable.

E.g., a step 212 executes an organizational rule which consists in assigning an incoming set $\{F_{2,m,n}\}$ to segment $\text{Seg}(F_{1,j,k})$, unique for all of the segments or even the selected sub-bands, or different, for instance depending on logical criteria pre-established at the transmitters or receivers of the signals, on granted data rates, communication protocols, semantics of content, or the like.

E.g., a step 213 executes an optimization rule which consists in translating the lower limit $\text{Inf}(\text{Seg}(F_{1,j,k}))$ of the frequency segment $\text{Seg}(F_{1,j,k})$ so as to map it to the upper limit $\text{Sup}(\{_{2,m,n}\})$, apart from a safety margin.

A step 214 associated with step 213 then updates the upper limit $\text{Sup}(\{F_{2,m,n}\})$ so as to take into account the addition of the segment $\text{Seg}(F_{1,j,k})$ translated into set $\{F_{2,m,n}\}$.

The steps which have just been described can be executed in extenso in real time or hidden time.

FIG. 8 shows a matrix 60 useful for implementing the method of the invention.

Each row of the matrix 60 is dedicated to an input frequency sub-band $F_{1,j,k}$ in set $\{F_1\}$. Each column of matrix 60 is dedicated to an output frequency sub-band $F_{2,m,n}$ in set $\{F_2\}$.

At the intersection of one row and one column, the value 1 means that a segment covering the entire width of the frequency sub-band is translated. A value comprised between 0 and 1 means that only a segment covering part of the width of the frequency sub-band is translated. E.g., a value of 0.2 means that only a segment covering 20% of the width of the frequency sub-bands is translated.

From FIG. 8, it is apparent which segment of frequency set $\{F_1\}$ is carried by which segment of frequency set $\{F_2\}$.

E.g., the segment covering the entire width of frequency sub-band $F_{1,1,1}$ is entirely carried on a segment of frequency sub-band $F_{2,1,1}$.

In a frequency sub-band, only part of the signals can possibly be used at a moment t. In order to optimize as finely as possible the frequency spectrum in the frequency set $\{F_2\}$, only the segment(s) of the wanted sub-band will be treated. By introducing values smaller than 1 into the organizational, selection, and optimization matrix 60, storage in the output spectrum of the signals actually used can then be optimized.

E.g., a segment covering 20% of frequency sub-band $F_{1,N,1}$ is carried on a segment of frequency sub-band $F_{2,N,1}$.

The frequency sub-band $F_{2,N,1}$ can thus be divided into several segments to be carried on as many segments of frequency set $\{F_2\}$.

We have just described a method which for transmitting electromagnetic signals received in one or more first frequency bands, applies a conversion 59 to the signals by performing the steps of: selecting first frequency sub-bands forming a first set $\{F_{1,1,k}\}$ of frequency sub-bands of said first frequency band(s); in accordance with organizational rules, associating with each first frequency sub-band $F_{1,1,k}$, $F_{1,1,2}$, $F_{1,1,3}$, $F_{1,1,4}$ forming said first set one or more second sets $\{F_{2,p,q}\}$, $\{F_{2,m,n}\}$ of frequency sub-bands $F_{2,1,k}$, $F_{2,1,2}$, $F_{2,1,4}$ forming one or more second frequency bands; and in accordance with optimization rules, determining frequency translations so as to transpose signals received in the first frequency sub-bands to signals transmitted in the second frequency band(s).

The method of the invention can be implemented by software by means of firmware which can be executed by digital signal processors (DSP) in the frequency bands compatible with the clock frequency of the processors.

The method of the invention can also be implemented by means of hardware devices using analog components such as filters, switches, mixers, or the like, for instance for a simple frequency plane.

For simple or complex frequency planes digital architectures can be built by combining various electronic components into chains comprising analog/digital converters (ADC) and digital/analog converters (DAC), followed by digital down converters (DDC), numerically controlled oscillators (NCO), then digital filters in turn followed by digital up converters (DUG) and again NCOs. Implementation can be done with dedicated components or with field programmable gate arrays (FPGA), DSPs or application-specific integrated circuits (ASIC) the functions of which allow for wanted and/or unwanted segments to be filtered and/or translated.

Analog and digital solutions may be combined.

Figure 9:
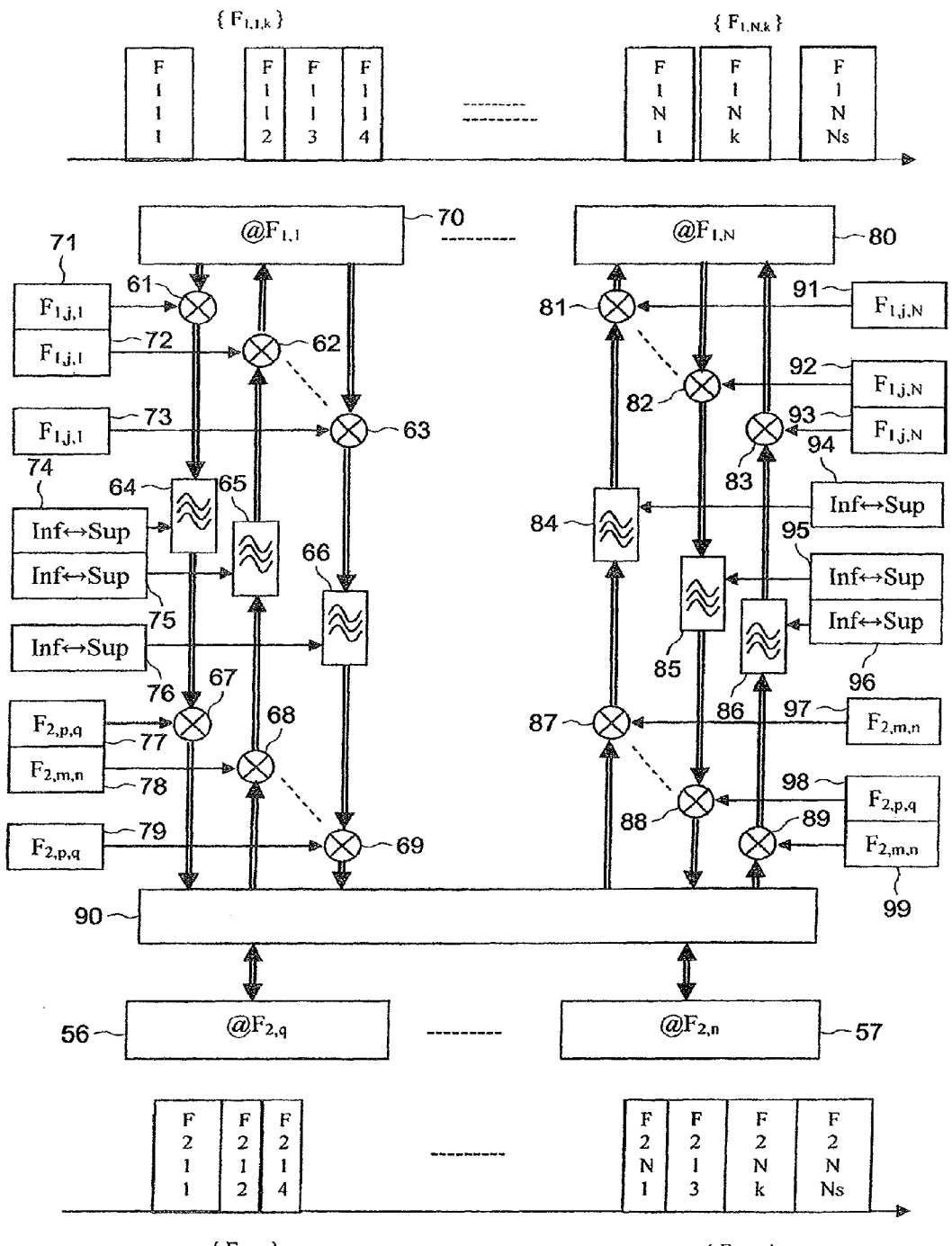
FIG. 9 is a diagram of a device according to the invention.

FIG. 9 shows a possible diagram of a device according to the invention.

An interface module 70, 80 is tuned to each of the N frequency bands $\{_{1,j,k}\}$ from band $\{F_{1,j,1}\}$ to band $\{F_{1,J,N}\}$.

In the example illustrated by FIG. 9, the device for transmitting electromagnetic signals received on first frequency bands $\{F_{1,j,1}\}$, $\{F_{1,j,N}\}$ comprises a bank of filters 64, 66 downstream of the interface module 70, each filter having a predetermined pass band or a pass band adjustable by a pass band adapter 74, 76 so as to superimpose the pass band of the filter to a first frequency sub-band segment, and downstream of the interface module 80 a bank of filters 85 each having a predetermined pass band or a pass band adjustable by a pass band adapter 95 so as to superimpose the pass band of the filter to another first frequency sub-band segment. The variable filters can be embodied by digital filters or analog filter bars with switches.

The pass band adapters 74, 76, 95 can be parameterized for instance starting with step 212 of the method executed for instance in a supervisory computer, not represented.

Arranged between the interface modules 70, 80 and the input of each filter 64, 66, 85, a first frequency converter 61, 63, 82 is sized to intersect a first sub-band $F_{1,j,k}$ of the first frequency band with the pass band of the filter associated therewith. The frequency converter is embodied by an analog mixer or an NCO in order to perform a frequency change so that after conversion, the sub band $F_{1,j,k}$ is mapped to the pass band of the filter. Here again, frequency conversion or translation is predetermined or adjustable by an input setpoint generator 71, 73, 92 so as to intersect with the pass band of the filter associated therewith the first frequency sub-band in which signals considered wanted are received.

The input setpoint generators 71, 73, 92 can for instance be parameterized starting with steps 100 and 101 of the method, executed for instance in the supervisory computer.

The first converters, controlled or not by the first setpoint generators, combined with the filters controlled or not by the pass band adapters, are thus means for selecting frequency sub-bands.

At the output of each filter 64, 66, 85, a second frequency converter 67, 69, 88, is sized for bringing the pass band of the filter associated therewith to a second sub-band of a second frequency band $\{F_{2,p,q}\}$, $\{F_{2,m,n}\}$.

The frequency converter is embodied by an analog mixer or an NCO for making a frequency change so that after conversion the sub-band $F_{1,j,k}$ is mapped to a sub-band of the second frequency set at the filter output. Here again, frequency conversion or translation is predetermined or adjustable by an output setpoint generator 77, 79, 98 in order to release the second frequency sub-band obtained at the filter output, related to at least one other frequency sub-band of the second frequency set.

The output setpoint generators 77, 79, 98 can for instance be parameterized starting with steps 203 or 213 of the method, executed in the supervisory computer.

The second converters, controlled or not by the second setpoint generators, combined with the filters controlled or not by the pass band adapters, are thus means for associating second frequency sub-bands with the first frequency sub-bands and frequency translating in view of transposing the signals received.

A summing and routing module 90 then directs the signals at the output of second converters to interface modules 56, 57, e.g. each dedicated to a frequency band of the second set $\{F_2\}$, or even to the medium intended for transmitting the signals.

E.g., when the device described is installed in unit 42 or unit 43 of the WRRH system, interface module 56 is dedicated to the wireless link 52 or 51, and interface module 57 is dedicated to the wireless link 46 or 44.

E.g., when the device described is installed in unit 13 or unit 32 of the WRRH system, interface module 56 is dedicated to the wireless link 14 or 10, and interface module 57 is dedicated to the wireless link 19 or 36.

The summing and routing module 90 of each device installed in units 12, 13, 32, 33 is preferably managed by the supervisory computer.

As already explained above in the description, the method is reversible, which is equally true for the device.

The reverse summing and routing module 90, the signals received from the interface modules 56, 57 for instance each dedicated to a frequency band of the second set $\{F_2\}$, intended for interface modules 70, 80 dedicated to the pass band of the first set $\{F_1\}$, wherein the signals received are to be retransmitted.

E.g., when the device described is installed in unit 42 or unit 43 of the WRRH system, interface module 56 is dedicated to the wireless link 51 or 52, e.g., for GSM, and interface module 57 is dedicated to the wireless link 44 or 46, e.g. for UMTS. In the device installed in unit 42, the signals received on link 51 by interface module 56 in frequency band $\{F_{2,p,q}\}$ are directed toward interface module 70 tuned to a radiofrequency band of GSM. The signals received on link 44 by interface module 57 in frequency band $\{F_{2,m,n}\}$ are directed toward the interface module 80 tuned to a UMTS radiofrequency band.

E.g., when the device described is installed in unit 32 of the WRRH system, interface module 56 is dedicated to the wireless communication link 19 with unit 13, and interface module 57 is dedicated to the wireless communication link 34 with unit 33. Signals from the signals received on link 19 by interface module 56 in frequency bands $\{F_{2,p,q}\}$ are for instance for the mobile terminal 1 in the handover phase from antenna 5 to antenna 35, they are then directed toward interface module 70 tuned to a radiofrequency band comprising a sub-band $F_{1,1,k}$ which can be assigned to mobile terminal 1. Signals from the signals received on link 34 by interface module 57 in frequency band for instance involve the mobile terminal 3 covered by antenna 35; they are directed toward interface module 80 tuned to a communication radiofrequency band with mobile terminal 3.

A person skilled in the art will easily deduce other possible applications, such as for instance macro-diversity management.

In the example illustrated by FIG. 9, the device for transmitting electromagnetic signals received on frequency bands $\{F_{2,p,q}\}$, $\{F_{2,m,n}\}$, comprises downstream of summing and routing module 90 a filter bank 65, 84, 86 each having a predetermined pass band or a pass band adjustable by a pass band adapter 75, 94, 96 so as to superimpose the pass band of the filter to an input frequency sub-band segment. The variable filters can be embodied by digital filters or analog filter bars with switches.

The pass band adapters 75, 94, 96 can for instance be parameterized starting with step 212 of the method executed for instance in the supervisory computer, not represented.

Arranged between summing and routing module 90 and the input of each filter 65, 84, 86, a first frequency converter 68, 87, 89 is sized for intersecting a first sub-band $F_{2,m,n}$ of the first frequency band with the pass band of the filter associated therewith. The frequency converter is embodied by an analog mixer or an NCO for making a frequency change so that after conversion the sub-band $F_{2,m,n}$ is mapped to the pass band of the filter. Here again, frequency conversion or translation is predetermined or adjustable by an input setpoint generator 78, 97, 99 so as to intersect the pass band of the filter associated therewith the first frequency sub-band in which signals considered wanted are received.

The input setpoint generators 78, 97, 99 can for instance be parameterized starting with steps 100 and 101 of the method executed in the supervisory computer.

The first converters, controlled or not by the first setpoint generators, combined with the filters controlled or not by the pass band adapters, are thus means for selecting frequency sub-bands.

At the output of each filter 65, 84, 86, a second frequency converter 62, 81, 83, is sized for bringing the pass band of the filter associated therewith to a second sub-band of a second frequency band $\{F_{1,1,k}\}$, $\{F_{1,N,k}\}$.

The frequency converter is embodied by an analog mixer or an NCO for making a frequency change so that after conversion, sub-band $F_{2,m,n}$ is mapped to a sub-band of the second frequency set at the filter output. Here again, frequency conversion or translation is predetermined or adjustable by an output setpoint generator 72, 91, 93 so as to release the second frequency sub-band obtained at the output of the filter, related to at least one other frequency sub-band of the second frequency set.

The output setpoint generators 72, 91, 93 can for instance be parameterized starting with steps 203 or 213 of the method executed in the supervisory computer.

The second converters, controlled or not by the second setpoint generators, combined with the filters controlled or not by the pass band adapters, are thus means for associating second frequency sub-bands with the first frequency sub-bands and frequency translating in view of transposing the signals received.

In FIG. 9, the dotted lines between frequency converters 62 and 63, 68 and 69, or 81 and 82, 87 and 88, indicate that several uplinks or downlinks are possible. The diagram of FIG. 2 is simply one of several examples. The device represented may also comprise only down-arrows.

Spectral configuration can be static, reconfigurable, or dynamic. Dynamic response may depend on different parameters, for instance quality of service (QoS), spectrum usage, interferences, spectrum usage rules, network developments, spectrum modifications, or the like. The system may also incorporate self-detecting methods, for instance of collisions or saturation, allowing for automatic self-reconfiguration.

A person skilled in the art will appreciate that the principles and means which have just been explained for a single sector, single operator scenario are easily adaptable to be applicable also to multiple sector and/or multiple operator applications. By way of example and not to be restrictive, selecting receiving frequency sub-bands can be done for instance for a first operator A, then for a second operator B, then for a third operator C, and so on for several operators.

A person skilled in the art will appreciate that the principles and means which have just been explained are easily adaptable to other applications provided the RRH (Remote Radio Head) or the ODU module (Outdoor Radio Unit), for instance in the case of radio links, can be used with a wireless link instead of a coaxial link or optical fiber. The principle is also applicable to a set of optical wavelengths (λi) for instance in radio over fiber techniques.

While the present technology has been described in connection with a series of preferred embodiment, these descriptions are not intended to limit the scope of the technology to the particular forms set forth herein. It will be further understood that the methods of the technology are not necessarily limited to the discrete steps or the order of the steps described. To the contrary, the present descriptions are intended to cover such alternatives, modifications, and equivalents as may be included within the spirit and scope of the technology as defined by the appended claims and otherwise appreciated by one of ordinary skill in the art.

What is claimed is:

1. A method for transmitting electromagnetic signals received in one or more first frequency bands, comprising:
    selecting first frequency sub-bands as a first set of frequency sub-bands of the first frequency band(s);
    in accordance with organizational rules, associating with each of the first frequency sub-bands of the first set, one or more second sets of frequency sub-bands of one or more second frequency bands; and
    determining, for each of the first frequency sub-bands selected, frequency translations for transposing the signals received in the first frequency sub-bands to signals transmitted in the second frequency band(s) in order to defragment the first set of frequency sub-bands in the second frequency band(s) by reducing width of the second frequency band(s).

2. The method according to claim 1, including selecting only the first frequency sub-bands in which electromagnetic signals considered wanted are received.

3. The method according to claim 1, wherein the organizational rules include rules of associating a second frequency sub-band with a segment covering all or part of a first frequency sub-band.

4. The method according to claim 1, where in the organizational rules include rules for building the one or more second sets of frequency sub-bands adjacent to at least one other frequency sub-band of the second set.

5. The method according to claim 1, used in a cellular communication network.

6. The method according to claim 1, wherein the signals are transmitted over a wireless connection.

7. The method according to claim 1, wherein the signals are transmitted via an optical fiber.

8. A device for transmitting electromagnetic signals received in one or more first frequency bands, comprising:
    a first frequency converter at an input of a filter that is driven to select a first sub-band of a first frequency band by transposing the signals received in the first sub-band to a pass band of the filter associated with the first frequency converter; and
    a second frequency converter at the input of the filter that is driven to apply a frequency translation to defragment a first frequency set in a second frequency set in view of reducing the width of a second frequency band, by transposing the signals going through the pass band of the filter, in a second sub-band of the second frequency band associated with the selected first sub-band.

9. The device according to claim 8, wherein the first frequency converter is controlled by an input setpoint generator to intersect with the pass band of the filter associated with a first frequency sub-band in which wanted signals are received.

10. The device according to claim 8, wherein the filter is controlled by a pass band adapter to superimpose the pass band of the filter on a first frequency sub-band segment.

11. The device according to claim 8, wherein the second frequency converter is controlled by an output setpoint generator to release the second sub-band obtained at the filter, adjacent at least one other frequency sub-band of the second frequency set.

* * * * *